United States Patent
Simpson et al.

(10) Patent No.: US 9,362,962 B2
(45) Date of Patent: Jun. 7, 2016

(54) METHODS AND SYSTEMS FOR ENERGY-EFFICIENT COMMUNICATIONS INTERFACE

(71) Applicant: Kandou Labs, S.A., Lausanne (CH)

(72) Inventors: Richard Simpson, Bedford (GB); Andrew Kevin John Stewart, Ascote (GB); Brian Holden, Monte Sereno, CA (US); Amin Shokrollahi, Préverenges (CH)

(73) Assignee: KANDOU LABS, S.A. (CH)

( * ) Notice: Subject to any disclaimer, the term of this patent is extended or adjusted under 35 U.S.C. 154(b) by 0 days.

(21) Appl. No.: 14/014,082

(22) Filed: Aug. 29, 2013

(65) Prior Publication Data

US 2015/0063494 A1 Mar. 5, 2015

(51) Int. Cl.
*H04L 25/06* (2006.01)
*H04L 25/10* (2006.01)
*H04B 1/06* (2006.01)

(52) U.S. Cl.
CPC ........................................ *H04B 1/06* (2013.01)

(58) Field of Classification Search
CPC ......... H04L 25/49; H03M 5/145; H03M 7/14
See application file for complete search history.

(56) References Cited

U.S. PATENT DOCUMENTS

| | | | |
|---|---|---|---|
| 3,196,351 A | 7/1965 | Slepian | |
| 3,636,463 A | 1/1972 | Ongkiehong | |
| 3,939,468 A | 2/1976 | Mastin | |
| 4,163,258 A | 7/1979 | Ebihara et al. | |
| 4,181,967 A | 1/1980 | Nash et al. | |
| 4,206,316 A | 6/1980 | Burnsweig et al. | |
| 4,276,543 A | 6/1981 | Miller | |
| 4,486,739 A | 12/1984 | Franaszek et al. | |
| 4,499,550 A | 2/1985 | Ray et al. | |
| 4,774,498 A | 9/1988 | Traa | |
| 4,864,303 A * | 9/1989 | Ofek | ................................ 341/95 |
| 4,897,657 A | 1/1990 | Brubaker | |
| 5,053,974 A | 10/1991 | Penz | |
| 5,166,956 A | 11/1992 | Baltus et al. | |

(Continued)

FOREIGN PATENT DOCUMENTS

| | | |
|---|---|---|
| CN | 101478286 | 7/2009 |
| EP | 2039221 B1 | 3/2009 |

(Continued)

OTHER PUBLICATIONS

International Search Report and Written Opinion for PCT/US14/53563 mailed on Nov. 25, 2014.

(Continued)

*Primary Examiner* — Daniel Washburn
*Assistant Examiner* — Amneet Singh
(74) *Attorney, Agent, or Firm* — Invention Mine LLC

(57) ABSTRACT

In a high-impedance communications interface, driver energy consumption is proportional to the number of signal transitions. For signals having three or more distinct levels, it is possible for a signal driver to salvage energy from some downward signal transitions and reuse it on some subsequent upward signal transitions. To facilitate this energy-conserving behavior, communication is performed using group signaling over sets of wires using a vector signaling code, with the design and use of the vector signaling code insuring that energy availability is balanced with energy demand.

20 Claims, 8 Drawing Sheets

(56) References Cited

U.S. PATENT DOCUMENTS

| | | | |
|---|---|---|---|
| 5,168,509 A | 12/1992 | Nakamura et al. | |
| 5,283,761 A | 2/1994 | Gillingham | |
| 5,287,305 A | 2/1994 | Yoshida | |
| 5,412,689 A | 5/1995 | Chan et al. | |
| 5,459,465 A | 10/1995 | Kagey | |
| 5,511,119 A | 4/1996 | Lechleider | |
| 5,553,097 A | 9/1996 | Dagher | |
| 5,599,550 A | 2/1997 | Kohlruss et al. | |
| 5,659,353 A | 8/1997 | Kostreski et al. | |
| 5,825,808 A | 10/1998 | Hershey et al. | |
| 5,875,202 A | 2/1999 | Venters | |
| 5,945,935 A | 8/1999 | Kusumoto | |
| 5,995,016 A | 11/1999 | Perino | |
| 6,005,895 A | 12/1999 | Perino et al. | |
| 6,084,883 A | 7/2000 | Norrell et al. | |
| 6,119,263 A | 9/2000 | Mowbray | |
| 6,172,634 B1 | 1/2001 | Leonowich et al. | |
| 6,175,230 B1 | 1/2001 | Hamblin et al. | |
| 6,232,908 B1 | 5/2001 | Nakaigawa | |
| 6,278,740 B1 | 8/2001 | Nordyke | |
| 6,346,907 B1 | 2/2002 | Dacy | |
| 6,359,931 B1 | 3/2002 | Perino et al. | |
| 6,404,820 B1 | 6/2002 | Postol | |
| 6,417,737 B1 | 7/2002 | Moloudi et al. | |
| 6,452,420 B1 | 9/2002 | Wong | |
| 6,483,828 B1 | 11/2002 | Balachandran | |
| 6,504,875 B2 | 1/2003 | Perino et al. | |
| 6,509,773 B2 | 1/2003 | Buchwald | |
| 6,556,628 B1 | 4/2003 | Poulton et al. | |
| 6,563,382 B1 | 5/2003 | Yang et al. | |
| 6,621,427 B2 | 9/2003 | Greenstreet | |
| 6,650,638 B1 | 11/2003 | Walker et al. | |
| 6,661,355 B2 | 12/2003 | Cornelius et al. | |
| 6,686,879 B2 | 2/2004 | Shattil | |
| 6,766,342 B2 | 7/2004 | Kechriotis | |
| 6,839,429 B1 | 1/2005 | Gaikwald et al. | |
| 6,854,030 B2 | 2/2005 | Perino | |
| 6,898,724 B2 | 5/2005 | Chang | |
| 6,927,709 B2 | 8/2005 | Kiehl | |
| 6,954,492 B1 | 10/2005 | Williams | |
| 6,963,622 B2 | 11/2005 | Eroz | |
| 6,990,138 B2 | 1/2006 | Bejjani et al. | |
| 6,999,516 B1 | 2/2006 | Rajan | |
| 7,023,817 B2 | 4/2006 | Kuffner | |
| 7,053,802 B2 | 5/2006 | Cornelius | |
| 7,075,996 B2 | 7/2006 | Simon et al. | |
| 7,085,153 B2 | 8/2006 | Ferrant et al. | |
| 7,085,336 B2 | 8/2006 | Lee | |
| 7,127,003 B2 | 10/2006 | Rajan | |
| 7,130,944 B2 | 10/2006 | Perino | |
| 7,142,612 B2 | 11/2006 | Horowitz et al. | |
| 7,142,865 B2 | 11/2006 | Tsai | |
| 7,164,631 B2 | 1/2007 | Tateishi | |
| 7,167,019 B2 | 1/2007 | Broyde et al. | |
| 7,180,949 B2 | 2/2007 | Kleveland et al. | |
| 7,184,483 B2 | 2/2007 | Rajan | |
| 7,269,212 B1 | 9/2007 | Chau et al. | |
| 7,356,213 B1 | 4/2008 | Cunningham et al. | |
| 7,358,869 B1 | 4/2008 | Chiarulli et al. | |
| 7,362,130 B2 | 4/2008 | Broyde et al. | |
| 7,370,264 B2 | 5/2008 | Worley | |
| 7,389,333 B2 | 6/2008 | Moore et al. | |
| 7,456,778 B2 | 11/2008 | Werner et al. | |
| 7,462,956 B2 | 12/2008 | Lan | |
| 7,535,957 B2 | 5/2009 | Ozawa | |
| 7,570,704 B2 | 8/2009 | Nagarajan | |
| 7,599,390 B2 | 10/2009 | Pamarti | |
| 7,633,850 B2 | 12/2009 | Ahn | |
| 7,656,321 B2 | 2/2010 | Wang | |
| 7,694,204 B2 | 4/2010 | Schmidt | |
| 7,706,456 B2 | 4/2010 | Laroia et al. | |
| 7,706,524 B2 | 4/2010 | Zerbe | |
| 7,746,764 B2 | 6/2010 | Rawlins et al. | |
| 7,787,572 B2 | 8/2010 | Scharf et al. | |
| 7,804,361 B2 | 9/2010 | Lim | |
| 7,808,883 B2 | 10/2010 | Green | |
| 7,882,413 B2 | 2/2011 | Chen et al. | |
| 7,907,676 B2 | 3/2011 | Stojanovic | |
| 7,933,770 B2 | 4/2011 | Kruger et al. | |
| 8,036,300 B2 | 10/2011 | Evans | |
| 8,050,332 B2 | 11/2011 | Chung | |
| 8,064,535 B2 | 11/2011 | Wiley | |
| 8,085,172 B2 | 12/2011 | Li | |
| 8,091,006 B2 | 1/2012 | Prasad et al. | |
| 8,106,806 B2 | 1/2012 | Toyomura | |
| 8,159,375 B2 | 4/2012 | Abbasfar | |
| 8,159,376 B2 | 4/2012 | Abbasfar | |
| 8,185,807 B2 | 5/2012 | Oh | |
| 8,199,849 B2 | 6/2012 | Oh | |
| 8,199,863 B2 | 6/2012 | Chen | |
| 8,218,670 B2 | 7/2012 | Abou Rjeily | |
| 8,245,094 B2 | 8/2012 | Jiang | |
| 8,279,094 B2 | 10/2012 | Abbasfar | |
| 8,295,250 B2 | 10/2012 | Gorokhov | |
| 8,310,389 B1 | 11/2012 | Chui | |
| 8,429,495 B2 | 4/2013 | Przybylski | |
| 8,442,099 B1 | 5/2013 | Sederat | |
| 8,442,210 B2 | 5/2013 | Zerbe | |
| 8,443,223 B2 | 5/2013 | Abbasfar | |
| 8,451,913 B2 | 5/2013 | Oh | |
| 8,462,891 B2 | 6/2013 | Kizer et al. | |
| 8,498,344 B2 | 7/2013 | Wilson | |
| 8,520,493 B2 | 8/2013 | Goulahsen | |
| 8,539,318 B2 | 9/2013 | Cronie | |
| 8,547,272 B2 | 10/2013 | Nestler et al. | |
| 8,577,284 B2 | 11/2013 | Seo et al. | |
| 8,578,246 B2 | 11/2013 | Mittelholzer | |
| 8,588,254 B2 | 11/2013 | Diab | |
| 8,588,280 B2 | 11/2013 | Oh et al. | |
| 8,593,305 B1 | 11/2013 | Tajalli et al. | |
| 8,620,166 B2 | 12/2013 | Guha | |
| 8,649,445 B2 | 2/2014 | Cronie | |
| 8,649,460 B2 | 2/2014 | Ware et al. | |
| 8,649,556 B2 | 2/2014 | Wedge | |
| 8,711,919 B2 | 4/2014 | Kumar | |
| 8,718,184 B1 | 5/2014 | Cronie | |
| 8,773,964 B2 | 7/2014 | Hsueh | |
| 8,782,578 B2 | 7/2014 | Tell | |
| 8,897,134 B2 | 11/2014 | Kern | |
| 8,989,317 B1 | 3/2015 | Holden | |
| 9,015,566 B2 | 4/2015 | Cronie | |
| 9,059,816 B1 | 6/2015 | Simpson | |
| 9,077,386 B1 | 7/2015 | Holden | |
| 9,106,465 B2 | 8/2015 | Walter | |
| 9,124,557 B2 | 9/2015 | Fox | |
| 9,172,412 B2 | 10/2015 | Kim | |
| 2002/0044316 A1 | 4/2002 | Myers | |
| 2002/0057592 A1 | 5/2002 | Robb | |
| 2002/0163881 A1 | 11/2002 | Dhong | |
| 2002/0174373 A1 | 11/2002 | Chang | |
| 2003/0105908 A1* | 6/2003 | Perino et al. | 710/305 |
| 2003/0146783 A1 | 8/2003 | Brandy et al. | |
| 2004/0003336 A1 | 1/2004 | Cypher | |
| 2004/0003337 A1 | 1/2004 | Cypher | |
| 2004/0156432 A1 | 8/2004 | Hidaka | |
| 2005/0057379 A1 | 3/2005 | Jansson | |
| 2005/0135182 A1* | 6/2005 | Perino et al. | 365/230.06 |
| 2005/0152385 A1 | 7/2005 | Cioffi | |
| 2005/0174841 A1 | 8/2005 | Ho | |
| 2005/0213686 A1 | 9/2005 | Love et al. | |
| 2006/0115027 A1 | 6/2006 | Srebranig | |
| 2006/0133538 A1 | 6/2006 | Stojanovic | |
| 2007/0188367 A1 | 8/2007 | Yamada | |
| 2007/0263711 A1 | 11/2007 | Kramer et al. | |
| 2008/0104374 A1 | 5/2008 | Mohamed | |
| 2008/0159448 A1 | 7/2008 | Anim-Appiah et al. | |
| 2008/0284524 A1 | 11/2008 | Kushiyama | |
| 2009/0059782 A1 | 3/2009 | Cole | |
| 2009/0092196 A1 | 4/2009 | Okunev | |
| 2009/0154500 A1* | 6/2009 | Diab et al. | 370/477 |
| 2009/0185636 A1 | 7/2009 | Palotai et al. | |
| 2010/0046644 A1 | 2/2010 | Mazet | |
| 2010/0180143 A1 | 7/2010 | Ware et al. | |
| 2010/0205506 A1 | 8/2010 | Hara | |

(56) References Cited

U.S. PATENT DOCUMENTS

| | | | |
|---|---|---|---|
| 2011/0084737 A1* | 4/2011 | Oh et al. | 327/108 |
| 2011/0127990 A1* | 6/2011 | Wilson et al. | 324/76.44 |
| 2011/0268225 A1 | 11/2011 | Cronie et al. | |
| 2011/0299555 A1 | 12/2011 | Cronie et al. | |
| 2012/0161945 A1 | 6/2012 | Single | |
| 2012/0257683 A1 | 10/2012 | Schwager | |
| 2013/0010892 A1 | 1/2013 | Cronie et al. | |
| 2013/0051162 A1 | 2/2013 | Amirkhany et al. | |
| 2014/0132331 A1 | 5/2014 | Gonzalez Diaz | |
| 2015/0010044 A1 | 1/2015 | Zhang | |
| 2015/0078479 A1 | 3/2015 | Whitby-Strevens | |
| 2015/0199543 A1 | 7/2015 | Winoto | |

FOREIGN PATENT DOCUMENTS

| | | |
|---|---|---|
| JP | 2003163612 | 6/2003 |
| WO | 2009084121 | 7/2009 |
| WO | 2010031824 | 3/2010 |
| WO | 2011119359 | 9/2011 |

OTHER PUBLICATIONS

International Search Report and Written Opinion of the International Searching Authority, mailed Nov. 5, 2012, in International Patent Application S.N. PCT/EP2012/052767, 7 pages.

International Search Report and Written Opinion of the International Searching Authority, mailed Jul. 14, 2011 in International Patent Application S.N. PCT/EP2011/002170, 10 pages.

Healey, A., et al., "A Comparison of 25 Gbps NRZ & PAM-4 Modulation used in Legacy & Premium Backplane Channels", DesignCon 2012, 16 pages.

Clayton, P., "Introduction to Electromagnetic Compatibility", Wiley-Interscience, 2006.

She et al., "A Framework of Cross-Layer Superposition Coded Multicast for Robust IPTV Services over WiMAX," IEEE Communications Society subject matter experts for publication in the WCNC 2008 proceedings, Mar. 31, 2008-Apr. 3, 2008, pp. 3139-3144.

Poulton, et al., "Multiwire Differential Signaling", UNC-CH Department of Computer Science Version 1.1, Aug. 6, 2003.

Skliar et al., A Method for the Analysis of Signals: the Square-Wave Method, Mar. 2008, Revista de Matematica: Teoria y Aplicationes, pp. 09-129.

International Search Report and Written Opinion from PCT/US2014/034220 mailed Aug. 21, 2014.

International Search Report and Written Opinion for PCT/US14/052986 mailed Nov. 24, 2014.

Burr, "Spherical Codes for M-ARY Code Shift Keying", University of York, Apr. 2, 1989, pp. 67-72, United Kingdom.

Slepian, D., "Premutation Modulation", IEEE, vol. 52, No. 3, Mar. 1965, pp. 228-236.

Stan, M., et al., "Bus-Invert Coding for Low-Power I/O, IEEE Transactions on Very Large Scale Integration (VLSI) Systems", vol. 3, No. 1, Mar. 1995, pp. 49-58.

Tallini, L., et al., "Transmission Time Analysis for the Parallel Asynchronous Communication Scheme", IEEE Tranactions on Computers, vol. 52, No. 5, May 2003, pp. 558-571.

International Search Report and Written Opinion for PCT/EP2012/052767 mailed May 11, 2012.

International Search Report and Written Opinion for PCT/EP2011/059279 mailed Sep. 22, 2011.

International Search Report and Written Opinion for PCT/EP2011/074219 mailed Jul. 4, 2012.

Notification of Transmittal of the International Search Report and The Written Opinion of the International Searching Authority, or The Declaration for PCT/EP2013/002681, dated Feb. 25, 2014, 15 pages.

Ericson, T., et al., "Spherical Codes Generated by Binary Partitions of Symmetric Pointsets", IEEE Transactions on Information Theory, vol. 41, No. 1, Jan. 1995, pp. 107-129.

Farzan, K., et al., "Coding Schemes for Chip-to-Chip Interconnect Applications", IEEE Transactions on Very Large Scale Integration (VLSI) Systems, vol. 14, No. 4, Apr. 2006, pp. 393-406.

Abbasfar, A., "Generalized Differential Vector Signaling", IEEE International Conference on Communications, ICC '09, (Jun. 14, 2009), pp. 1-5.

Dasilva et al., "Multicarrier Orthogonal CDMA Signals for Quasi-Synchronous Communication Systems", IEEE Journal on Selected Areas in Communications, vol. 12, No. 5 (Jun. 1, 1994), pp. 842-852.

Wang et al., "Applying CDMA Technique to Network-on-Chip", IEEE Transactions on Very Large Scale Integration (VLSI) Systems, vol. 15, No. 10 (Oct. 1, 2007), pp. 1091-1100.

Cheng, W., "Memory Bus Encoding for Low Power: A Tutorial", Quality Electronic Design, IEEE, International Symposium on Mar. 26-28, 2001, pp. 199-204, Piscataway, NJ.

Brown, L., et al., "V.92: The Last Dial-Up Modem?", IEEE Transactions on Communications, IEEE Service Center, Piscataway, NJ., USA, vol. 52, No. 1, Jan. 1, 2004, pp. 54-61. XP011106836, ISSN: 0090-6779, DOI: 10.1109/tcomm.2003.822168, pp. 55-59.

Notification of Transmittal of International Search Report and The Written Opinion of the International Searching Authority, for PCT/US2015/018363, mailed Jun. 18, 2015, 13 pages.

Counts, L., et al., "One-Chip Slide Rule Works with Logs, Antilogs for Real-Time Processing," Analog Devices Computational Products 6, Reprinted from Electronic Design, May 2, 1985, 7 pages.

Design Brief 208 Using the Anadigm Multiplier CAM, Copyright 2002 Anadigm, 6 pages.

Grahame, J., "Vintage Analog Computer Kits," posted on Aug. 25, 2006 in Classic Computing, 2 pages, http.//www.retrothing.com/2006/08/classic_analog_html.

Schneider, J., et al., "ELEC301 Project: Building an Analog Computer," Dec. 19, 1999, 8 pages, http://www.clear.rice.edu/elec301/Projects99/anlgcomp/.

Tierney, J., et al., "A digital frequency synthesizer," Audio and Electroacoustics, IEEE Transactions, Mar. 1971, pp. 48-57, vol. 19, Issue 1, 1 page Abstract from http://ieeexplore.

"Introduction to: Analog Computers and the DSPACE System," Course Material ECE 5230 Spring 2008, Utah State University, www.coursehero.com, 12 pages.

Notification of Transmittal of The International Search Report and The Written Opinion of the International Searching Authority, or the Declaration, for PCT/US2014/015840, dated May 20, 2014. 11 pages.

Notification of Transmittal of The International Search Report and The Written Opinion of the International Searching Authority, or the Declaration, for PCT/US2014/043965, dated Oct. 22, 2014, 10 pages.

Notification of Transmittal of The International Search Report and The Written Opinion of the International Searching Authority, or The Declaration, dated Mar. 3, 2015, for PCT/US2014/066893, 9 pages.

Loh, M., et al., "A 3×9 Gb/s Shared, All-Digital CDR for High-Speed, High-Density I/O", Matthew Loh, IEEE Journal of Solid-State Circuits, vol. 47, No. 3, Mar. 2012.

Jiang, A., et al., "Rank Modulation for Flash Memories", IEEE Transactions of Information Theory, Jun. 2006, vol. 55, No. 6, pp. 2659-2673.

Oh, et al., Pseudo-Differential Vector Signaling for Noise Reduction in Single-Ended Signaling, DesignCon 2009.

International Search Report for PCT/US2014/053563, dated Nov. 11, 2014, 2 pages.

Zouhair Ben-Neticha et al, "The streTched—Golay and other codes for high-SNR finite-delay quantization of the Gaussian source at 1/2 Bit per sample", IEEE Transactions on Communications, vol. 38, No. 12 Dec. 1, 1990, pp. 2089-2093, XP000203339, ISSN: 0090-6678, DOI: 10.1109/26.64647.

Notification of Transmittal of the International Search Report and the Written Opinion of the International Searching Authority, or the Declaration, for PCT/US2015/043463, dated Oct. 16, 2015, 8 pages.

Notification of Transmittal of the International Search Report and The Written Opinion of the International Searching Authority, or the Declaration, for PCT/US2015/039952, dated Sep. 23, 2015, 8 pages.

Notification of Transmittal of the International Search Report and the Written Opinion of the International Searching Authority, or the Declaration, for PCT/US2015/041161, dated Oct. 7, 2015, 8 pages.

* cited by examiner

METHODS AND SYSTEMS FOR ENERGY-EFFICIENT COMMUNICATIONS INTERFACE

CROSS REFERENCES

The following references are herein incorporated by reference in their entirety for all purposes:

U.S. Patent Publication No. 2011/0268225 of U.S. patent application Ser. No. 12/784,414, filed May 20, 2010, naming Harm Cronie and Amin Shokrollahi, entitled "Orthogonal Differential Vector Signaling" (hereinafter "Cronie I");

U.S. Patent Publication No. 2011/0302478 of U.S. patent application Ser. No. 12/982,777, filed Dec. 30, 2010, naming Harm Cronie and Amin Shokrollahi, entitled "Power and Pin Efficient Chip-to-Chip Communications with Common-Mode Resilience and SSO Resilience" (hereinafter "Cronie II");

U.S. patent application Ser. No. 13/030,027, filed Feb. 17, 2011, naming Harm Cronie, Amin Shokrollahi and Armin Tajalli, entitled "Methods and Systems for Noise Resilient, Pin-Efficient and Low Power Communications with Sparse Signaling Codes" (hereinafter "Cronie III");

U.S. Provisional Patent Application No. 61/753,870, filed Jan. 17, 2013, naming John Fox, Brian Holden, Peter Hunt, John D. Keay, Amin Shokrollahi, Richard Simpson, Anant Singh, Andrew Kevin John Stewart, and Giuseppe Surace, entitled "Methods and Systems for Chip-to-chip Communication with Reduced Simultaneous Switching Noise" (hereinafter called "Fox I");

U.S. Provisional Patent Application No. 61/763,403, filed Feb. 11, 2013, naming John Fox, Brian Holden, Ali Hormati, Peter Hunt, John D. Keay, Amin Shokrollahi, Anant Singh, Andrew Kevin John Stewart, Giuseppe Surace, and Roger Ulrich, entitled "Methods and Systems for High Bandwidth Chip-to-Chip Communications Interface" (hereinafter called "Fox II"); and U.S. Provisional Patent Application No. 61/773,709, filed Mar. 6, 2013, naming John Fox, Brian Holden, Peter Hunt, John D. Keay, Amin Shokrollahi, Andrew Kevin John Stewart, Giuseppe Surace, and Roger Ulrich, entitled "Methods and Systems for High Bandwidth Chip-to-Chip Communications Interface" (hereinafter called "Fox III").

BACKGROUND

In communication systems, information may be transmitted from one physical location to another. Furthermore, it is typically desirable that the transport of this information is reliable, is fast and consumes a minimal amount of resources. One of the most common information transfer media is the serial communications link, which may be based on a single wire circuit relative to ground or other common reference, multiple such circuits relative to ground or other common reference, or multiple circuits used in relation to each other.

In the general case, a serial communications link is used over multiple time periods. In each such time period, a signal or signals over the link represents, and thus conveys, some amount of information typically measured in bits. Thus, at a high level, a serial communications link connects a transmitter to a receiver and the transmitter transmits a signal or signals each time period, the receiver receives signal or signals approximating those transmitted (as the result of signal degradation over the link, noise, and other distortions.) The information being conveyed by the transmitter is "consumed" by the transmitter, and representative signals are generated. The receiver attempts to determine the conveyed information from the signals it receives. In the absence of overall errors, the receiver can output exactly the bits that were consumed by the transmitter.

The optimum design of a serial communications link often depends on the application for which it is used. In many cases, there are trade-offs between various performance metrics, such as bandwidth (number of bits that can be conveyed per unit time and/or per period), pin efficiency (number of bits or bit equivalents that can be conveyed at one time divided by the number of wires required for that conveyance), power consumption (units of energy consumed by the transmitter, signal logic, receiver, etc. per bit conveyed), SSO resilience and cross-talk resilience, and expected error rate.

An example of a serial communications link is a differential signaling (DS) link. Differential signaling operates by sending a signal on one wire and the opposite of that signal on a paired wire; the signal information is represented by the difference between the wires rather than their absolute values relative to ground or other fixed reference. Differential signaling enhances the recoverability of the original signal at the receiver over single ended signaling (SES), by cancelling crosstalk and other common-mode noise. There are a number of signaling methods that maintain the desirable properties of DS while increasing pin-efficiency over DS. Many of these attempts operate on more than two wires simultaneously, using binary signals on each wire, but mapping information in groups of bits.

Vector signaling is a method of signaling. With vector signaling, pluralities of signals on a plurality of wires are considered collectively although each of the plurality of signals may be independent. Each of the collective signals is referred to as a component and the number of plurality of wires is referred to as the "dimension" of the vector. In some embodiments, the signal on one wire is entirely dependent on the signal on another wire, as is the case with DS pairs, so in some cases the dimension of the vector may refer to the number of degrees of freedom of signals on the plurality of wires instead of the number of wires in the plurality of wires.

With binary vector signaling, each component takes on a coordinate value (or "coordinate", for short) that is one of two possible values. As an example, eight SES wires may be considered collectively, with each component/wire taking on one of two values each signal period. A "code word" of this binary vector signaling is one of the possible states of that collective set of components/wires. A "vector signaling code" or "vector signaling vector set" is the collection of valid possible code words for a given vector signaling encoding scheme. A "binary vector signaling code" refers to a mapping and/or set of rules to map information bits to binary vectors. In the example of eight SES wires, where each component has a degree of freedom allowing it to be either of the two possible coordinates, the number of code words in the collection of code words is $2^8$, or 256.

With non-binary vector signaling, each component has a coordinate value that is a selection from a set of more than two possible values. A "non-binary vector signaling code" refers to a mapping and/or set of rules to map information bits to non-binary vectors.

Examples of vector signaling methods are described in Cronie I, Cronie II, Cronie III, Fox I, Fox II, and Fox III.

BRIEF SUMMARY

A transmitter and receiver can communicate using a serial communications link, wherein the serial communications link uses signaling that is based on a vector signaling code using three or more signal values, with intermediate transmit values and/or receive reference values obtained by averaging more extreme code values over time and/or over the code word. At the transmitter, such averaging eliminates the power consumption associated with generating and regulating intermediate voltages, and may allow energy stored in previous transmit cycles to be reused in the current transmit cycle. At the receiver, such averaging eliminates the power consumption associated with generating and regulating reference voltages, and may reduce detection errors resulting from inaccurate reference voltage levels. The design and use of the vector signaling code insures that the averaged values remain within allowable limits.

In accordance with at least one embodiment, processes and apparatuses provide for transmitting data over physical channels to provide a high speed, low latency interface providing high total bandwidth with high energy efficiency, such as to interconnect integrated circuit chips in a multi-chip system. In some embodiments, different voltage, current, etc. levels are used for signaling and more than two levels may be used, such as a ternary vector signaling code wherein each wire signal has one of three values, or a quaternary signaling system wherein each wire signal has one of four values.

This Brief Summary is provided to introduce a selection of concepts in a simplified form that are further described below in the Detailed Description. This Brief Summary is not intended to identify key or essential features of the claimed subject matter, nor is it intended to be used as an aid in determining the scope of the claimed subject matter. Other aspects of the various embodiments will be apparent to one of ordinary skill in the art upon review of the Detailed Description and the included drawings.

BRIEF DESCRIPTION OF THE DRAWINGS

Various embodiments in accordance with the present disclosure will be described with reference to the drawings. Same numbers are used throughout the disclosure and figures to reference like components and features.

DETAILED DESCRIPTION

Despite the increasing technological ability to integrate entire systems into a single integrated circuit, multiple chip systems and subsystems retain significant advantages. The physical infrastructure to support high-bandwidth chip-to-chip connectivity is available, if the power, complexity, and other circuit implementation issues for such interfaces could be resolved.

The basic requirements for such connectivity include high bandwidth, corresponding low communications latency, and low probability of error or data corruption. High bandwidth may be obtained by making the communications path extremely wide, by making the signaling rate extremely fast, or both. Pin limitations have historically constrained the use of wide interfaces, although technical advances such as flip chips, silicon interposers, and high-density interconnection wiring may now feasibly provide hundreds of physical chip-to-chip interconnection wires. However, even if such physical connectivity is possible, the power utilization and switching noise induced by simultaneous switched outputs (SSO) of many output pins may be intractable. Similarly, integrated circuit process technology now permits extremely high clock speeds to be used in serial line communications. However, these high speeds exacerbate signal integrity issues caused by interconnection impedance variations and signal crosstalk. Thus, it is observed that solutions capable of operating at moderately high speed and potentially wide interface width would be of particular value if they introduce minimal processing latency, mitigate SSO noise, and minimize transmit and receive power utilization.

General Assumptions

For purposes of comparison and without limitation, a reference interface design is assumed to use single-ended CMOS drivers to drive short non-terminated bussed or point-to-point interconnections, as is common practice. Inter-symbol interference and transmission line loss are considered to be small or negligible for the example use, and reference noise and thermal noise are considered to be tractable.

Figure 1:
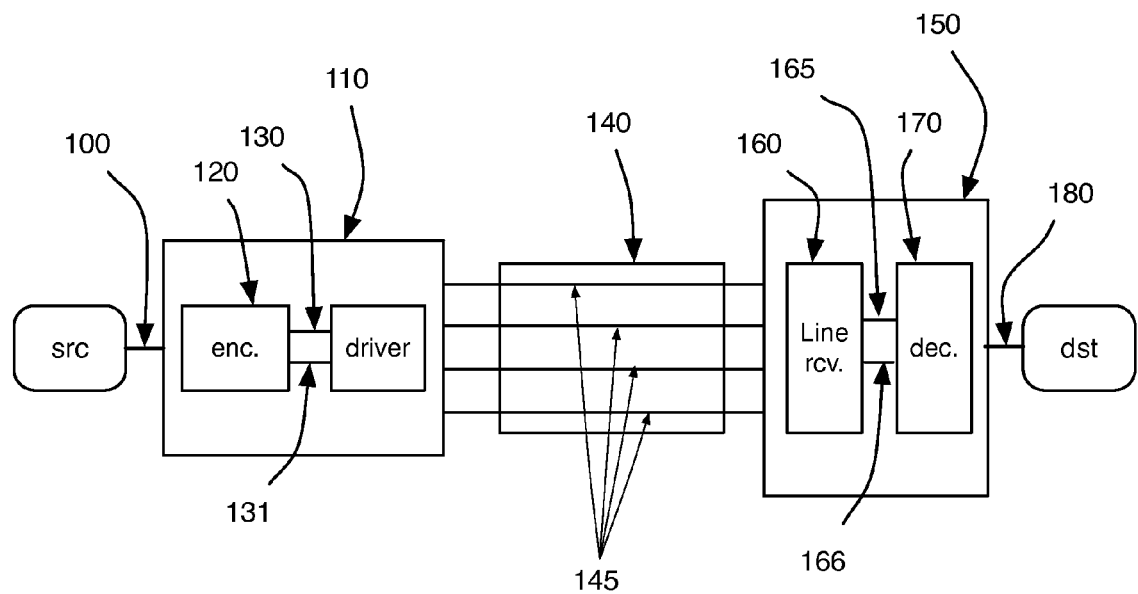
FIG. 1 is a block diagram of a communications systems incorporating a multiple wire interconnection between transmitter and receiver.

Similarly, for purposes of description and without limitation, examples of methods and apparatuses describing a particular physical interface width will assume data transfer occurs over one or more groups of signal wires or pins which may be proper subsets of the overall physical interface. The various examples presented herein utilize group or ensemble encoding of signals carried by such groups of signal wires or pins, also known as a vector signaling code. As shown in FIG. 1, the set of four wires 145 used as a signaling group 140 illustrates one embodiment. With such a group size, a physical interface of 128 wires would utilize 32 instances of the described embodiment. Embodiments based on group encoding using larger sets of wires are also described, along with the engineering trade-offs associated with selection of set size.

For purposes of description and without introduction of limitation, subsequent examples not specifying other values may be assumed to be based on an output width of eight, driving high impedance effectively capacitive output loads using a ternary code, an intermediate voltage source shared across eight outputs, and a vector code word of eight symbols. One of moderate skill in the art may easily apply the examples taught herein to applications with greater or lesser values for each such example constraint. Thus, as an example, the intermediate or mid-level voltage in a ternary example may be understood to encompass each of the multiple mid-level voltages required in a quaternary or higher-ordered output driver.

Some embodiments combine the described adiabatic generation of intermediate output levels with other known energy saving techniques. As an example, one such embodiment utilizes transition coding, to minimize the total number of output level changes needed to represent a given data pattern.

Various described embodiments may offer different degrees of SSO reduction, pin efficiency, and/or power consumption, with some embodiments allowing trading off among these and other constraints within the general teachings of the example.

Ternary Levels

In accordance with at least one embodiment, three distinct output levels may be transmitted on every transmission wire, in a "ternary coding" scheme. The coordinate levels of the ternary code correspond to voltage levels on the wires, which in turn may depend on the Vdd of the system and the swing of the signals. Unless otherwise specified, single-ended binary signaling assumes standard CMOS levels of 0*Vdd (which is typically equal to Vss) and 1*Vdd. A comparable Full-Swing (FS) ternary coding will use, as examples, voltage levels of 0*Vdd, ½*Vdd, and 1*Vdd. As one example, an output driver for a three level or ternary signaling method is shown in the circuit diagram 210 of FIG. 2, with a complimentary ternary input receiver shown as 220.

The multipliers used as examples are taken for purposes of descriptive clarity. Some embodiments may rely on other multiplier factors of Vdd or equivalent absolute signal levels satisfying the same signal identification purpose. As examples, one embodiment of reduced swing ternary signaling may use coordinates of ¼ Vdd, ½ Vdd, and ¾ Vdd, and another embodiment may use coordinates of 0 V, 300 mV, and 600 mV, each representing three distinct coordinate values spanning, in these examples, a Reduced-Swing (RS) range less than that of a full-swing CMOS binary signal.

Based on these examples, a knowledgeable practitioner may extend the described concepts to additional signal levels per wire. Embodiments utilizing quaternary or higher-ordered signaling may define four (or more) levels extending across the entire Vdd to Vss span to create a full-swing signaling scheme, or may define such levels contained within a smaller overall span, creating a reduced-swing signaling scheme.

Driver Power Consumption

In the case of a non-terminated CMOS driver, the main power drawn from the Vdd or positive supply rail is consumed in changing the voltage on the primarily capacitive load of the output line when the driver makes a transition from a lower state to a higher state. For a given load, the amount of consumed power is proportional to the magnitude of the transition. Stated differently, when transitioning from a state $(x1, \ldots, xk)$ to a following state $(y1, \ldots, yk)$ the driver power on k wires is proportional to the sum $\max(x1-y1, 0) + \ldots + \max(xk-yk, 0)$. This is independent of the particular reference chosen since the reference is canceled by taking differences. The power consumed by single-ended signals on k wires is between 0 and k, and the average power is k/4 since on a single wire a power consumption of 1 occurs only when transitioning from a 0 to a 1.

A similar calculation may be made to assess the power dissipated (or alternatively, the current injected into the Vss or ground rail) in changing the voltage on the primarily capacitive load of the output line when the driver makes a transition from a higher state to a lower state. In some embodiments, this flow of Vss or ground current may be as significant a design factor as the current drawn from the Vdd or supply rail.

Additional Driver Considerations

A conventional embodiment of a binary output driver is based on a CMOS inverter structure, where a totem pole pair of transistors is used to source current from the Vdd or positive supply rail to the output pin, or conversely to sink current from the output pin to the Vss or ground rail. Use of dedicated output driver power rails is known, either for purposes of noise isolation, or to allow the I/O to operate at different or distinct voltage levels compared to the main logic and/or memory systems. Cascaded chains of inverters are commonly used, with the transistors at each stage being scaled up in size and current capability from the extremely low node capacitance and current demands of an internal circuit node, to the relatively massive capacitance and proportionately large current demands of the actual output pin and external load.

In accordance with at least one embodiment, output drivers for ternary or higher-ordered output levels add additional intermediate voltage elements to the binary driver's single source and single sink transistor as illustrated in FIG. 2A. Such intermediary-level outputs may be based on CMOS transmission gate structures connecting an intermediate voltage rail to the output pin, or may alternatively use a single transistor in a source follower topology from such an intermediate voltage rail. Reduced-Swing embodiments may generate not only intermediary-level outputs but also one or both extreme output levels using such techniques, for example to reduce overall output level swing to less than Vdd-Vss.

Intermediate voltage levels may be generated on-chip, or may be provided from an external source to the chip or shared among several chips. It should be noted that linear regulator designs such as commonly used to regulate on-chip voltages represent current loads on their supply rail equal to the output current delivered. That is, linear regulation of, as an example, Vdd 1.8 volts to 0.8 volts at a load of 10 ma, will draw the same 10 ma from Vdd, dissipating 10 mw in the series pass transistor. Conversely, an external switching regulator which can incorporate discrete inductors and capacitors might draw merely 5.6 ma from a 1.8 volt supply, converting that power to 0.8 volts at 10 ma with 80% efficiency. Thus, the power dissipation advantages of codes incorporating additional output levels and/or smaller output level swings may be in some part mitigated by the inefficiencies of any associated on-chip voltage regulators using conventional techniques.

In some embodiments, the number and magnitude of allowable signal levels may be constrained by driver characteristics. As one example, transistors in some DRAM processes are characterized by rather high Vt values, which may result in relatively low gate overdrive with some combinations of desired output signal value and available voltage rail value.

SSO Noise

SSO is caused by transitions between output states. The SSO noise value may be normalized to a single number in the following sense: for the SSO on k wires, the SSO caused by the transition from a state $(x_1, \ldots, x_k)$ on the wires to a state $(y_1, \ldots, y_k)$ is set to be equal to $|(x_1-y_1) + \ldots + (x_k-y_k)|$ which in turn is equal to the absolute value of the sum of the coordinates of x minus the sum of the coordinates of y. Because a common reference is canceled through taking the difference, the SSO is independent of the reference.

For a single-ended binary system the SSO produced on 1 wire is either 0 or 1. When taking k wires, the worst case SSO is k, and it can be any number between 0 and k. Simple coding can reduce this number considerably, and even completely reducing it to zero in certain cases.

For single-ended binary signaling on k wires, the power consumption of every transition has a binomial distribution on $0, \ldots, k$ where the probability of a single event is ¼, and its average is k/4. The SSO of this signaling is also binomially distributed and the worst case SSO is k.

Receiver Power Consumption

In at least one embodiment, the primary source of static power consumption within the receiver is the differential line receiver or signal level comparator stage derived from a linear differential amplifier topology. Thus, additional comparators, such as to distinguish multiple signal levels per wire, may be associated with higher static receive current usage. These factors may be mitigated by gating or disabling comparator power when not required, and/or by using a dynamic rather than static design for the comparator stage. Other embodiments utilize line receivers derived from gate structures rather than differential comparators, as shown in circuit 220 of FIG. 2.

Even though the necessary current demands are low, generation of regulated reference voltages for use by the receive comparators represent a source of power consumption. Detection methods are known in the art that utilize either captured previous input values (as an example, using a sample-and-hold circuit) or time-averaged history values of previous inputs as reference levels for subsequent data detection. A known drawback to such methods is the ambiguous nature of such references during long runs of identical input values, during which no suitable samples may be obtained. The run-length limiting and transition balancing behaviors to be described to benefit generation of stable transmit mid-rail voltages also benefit such receive-side synthesis of reference levels.

Adiabatic Generation of Intermediate Transmission Levels

Figure 2:
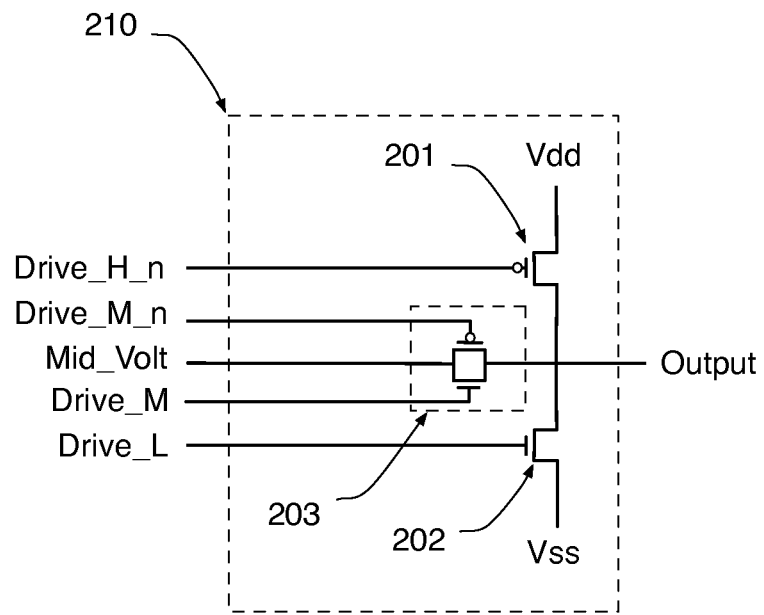
FIG. 2 shows schematic diagrams of a ternary line driver and ternary line receiver in accordance with at least one embodiment of the invention.
Figure 2:
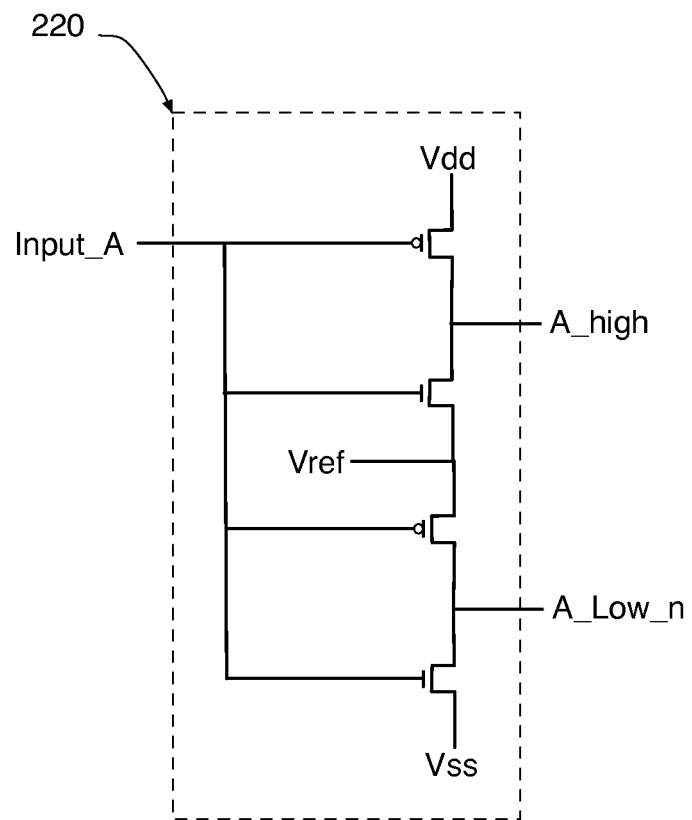

As shown in FIG. 2, one architecture for a ternary output line driver utilizes a conventional totem pole pair of CMOS transistors 201 and 202 to generate the extreme output levels (as an example, those designated as the symbol values "+" and "−" in the ternary code) and a CMOS transmission gate 203 connected to regulated intermediate voltage Mid_Volt to generate the middle level (in the same example, designated as the symbol value "0" in the ternary code.) As with any such outputs driving the essentially capacitive load of a high impedance unterminated signal line, drive current is primarily a function of output voltage change, adding or draining charge from the output capacitance.

Figure 3:
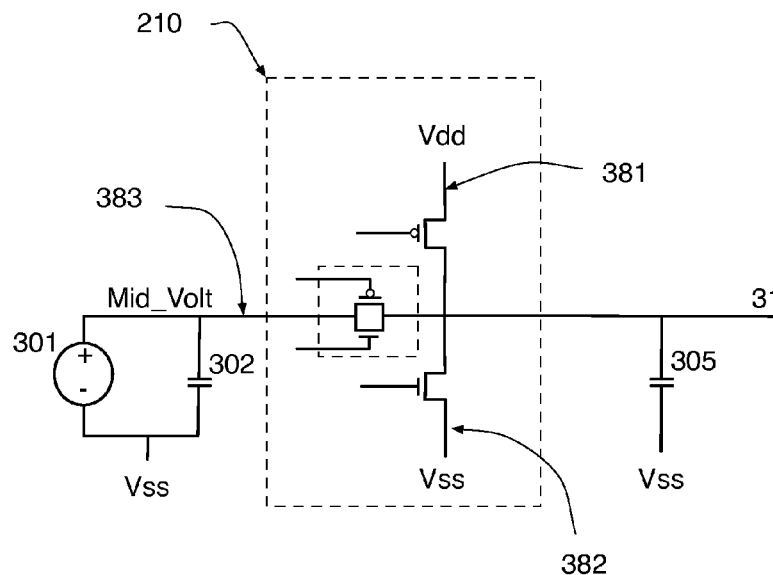
FIG. 3 illustrates the signal waveforms associated with operation of a ternary line driver such as shown in FIG. 2 in accordance with at least one embodiment of the invention.
Figure 3:
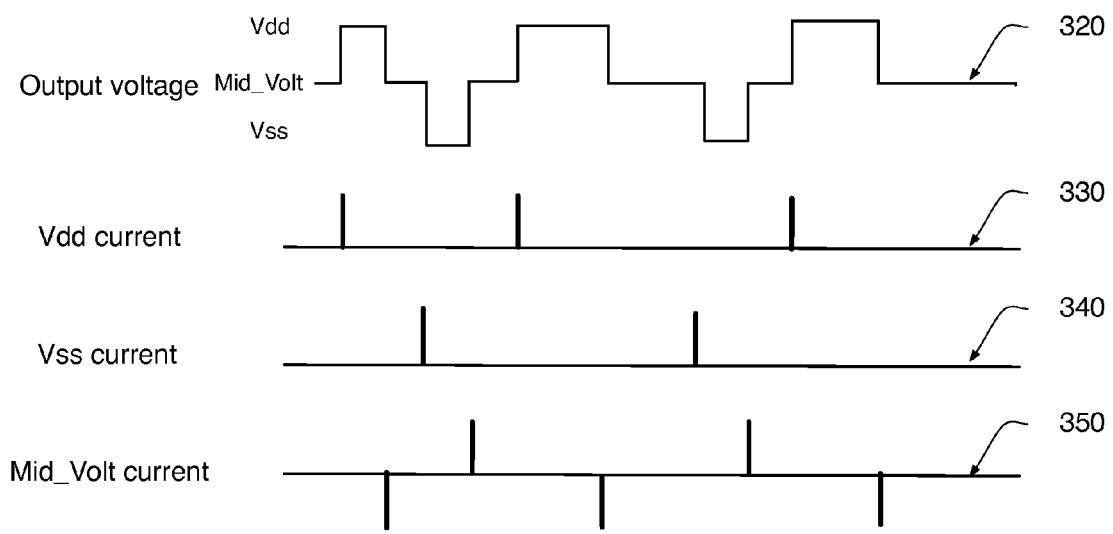

During simulation of such a ternary line driver 210 as illustrated in FIG. 3, it was observed that when outputting a "0" symbol value, the load on the intermediate voltage regulator 301 varied widely depending on the voltage of the driven output line 310 in the previous transmit unit interval. If the previous symbol value output was "+", the load capacitance 305 of the output line was already charged to Vdd, and current needed to be sunk by regulator 301 to bring the output to the 0 signal level. Conversely, if the previous symbol value output was "−", the load capacitance 305 was at Vss, and current needed to be sourced by regulator 301 to bring the output to the 0 signal level.

This behavior is illustrated by the graph of output voltage 320 as measured at 310. Each transition of 320 corresponds to a current spike on one of current graphs 330, 340, or 350; as examples, 330 showing current sourced from Vdd measured at point 381 for transitions to the + symbol value, 340 showing current sunk to Vss measured at point 382 for transitions to the − symbol value, and 350 showing current sunk by or sourced to Mid_Volt as measured at point 383 for transitions to the 0 symbol level respectively from a previous + or − level.

Further simulation of a test output sequence of alternating +0−0 . . . symbol value outputs indicated that the time-averaged energy consumption of regulator 301 approached zero; that is, a sufficiently large charge reservoir 302 associated with the intermediate voltage level could without any additional energy input store excess output charge on + to 0 transitions, and return stored charge to the output on − to 0 transitions, a so-called adiabatic behavior. Thus, as an example and without implying a limitation, a storage capacitor 10× or 20× larger in capacity than the capacitive output load could easily provide the necessary charge source or sink for the mid-level voltage on average, without significant other power regulation. The storage capacitance or comparable energy storage element may be provided on chip, or may represent an external device.

It is known that such "charge pump" behavior can be energetically inefficient, with the amount of energy loss in circuit resistance directly proportional to the amount of voltage change on the storage capacitance. However, in this application even relatively inefficient generation of "free" power for an intermediate voltage may represent a significant reduction in transmit power. For the example capacitive ratios, energy loss is small, energy storage is adequate to sustain multiple intermediate voltage transitions, and embodiment of local storage capacitance is conceivable. A smaller storage capacitor 302 relative to the output load capacitance 305 may place a greater load on regulator 301 to maintain Mid_Volt with acceptable tolerance, while a larger storage capacitor 302 may exceed reasonable on-chip implementation capabilities. As will be described, the required storage capacitor size is also dependent on how tightly the code used constrains its output stream to manage this adiabatic effect. In at least one embodiment, use of regulator 301 may be eliminated completely during normal communication channel operation, although startup may require either a small regulated voltage source or a "priming" sequence of output transitions to initialize the stored voltage.

As a single intermediate voltage may be shared across many output drivers (in one embodiment, by all drivers on a chip; in another embodiment, across multiple chips by use of one or more dedicated pins on each chip to provide the intermediate voltage and/or connection to external storage capacitance), the aggregate demand on the intermediate voltage supply can have a high crest factor (that is, significant peak demand versus average level) if multiple outputs make the same state transitions within a short period, or repeatedly transition between only + and 0 or only − and 0 symbol value outputs. For this reason, embodiments may incorporate constraints on construction of the vector signaling code and/or the allowable time sequence of consecutive encoded output values using the code, to limit that crest factor to acceptable levels.

It should be noted that the described adiabatic-compatible behavior is distinct from "balance", as that term is used to describe a vector signaling code. A balanced code will have a constant arithmetic sum over all of its symbol values for all code words. As an example, a ternary balanced code comprised of symbols of value +1, 0, and −1 will have an identical number of +1 and −1 symbols, such that all symbols sum to zero. However, consider the sequence of four balanced code words shown in Table 2, each having two +, four 0, and two − symbols:

TABLE 1

| | |
|---|---|
| 1st | + + 0 0 0 0 − − |
| 2nd | 0 0 0 0 − − + + |
| 3rd | 0 0 − − + + 0 0 |
| 4th | − − + + 0 0 0 0 |

If the code word sequence of Table 1 is transmitted in the repeating order $1^{st}$, $2^{nd}$, $3^{rd}$, $4^{th}$ . . . it may be observed that every transition to the "0" level on any wire occurs from a previous "+" level, thus this sequence will demand that the mid-voltage supply continually sink current. Conversely, if the sequence is transmitted in the reverse order $4^{th}$, $3^{rd}$, $2^{nd}$, $1^{st}$, . . . every transition to the "0" level on any wire occurs from a previous "−" level, thus demanding that the mid-voltage supply continually source current. Thus, adiabatic-compatible code behavior is a function of the dynamic characteristics or transition history over time, not the static representation of a single code word in isolation. Similarly, assessment of an adiabatic figure of merit for any proposed code must take into effect both possible code word sequences having such atypical or pathological behavior, and the time interval over which the assessment is averaged.

Protocols to Resolve Code Constraints

Particular codes are designed to satisfy specific sets of use conditions, formally called constraints. Thus, as examples, a given code may be designed to require constant energy for transmission of any possible encoded pattern (constant weight or balance,) encode data with a specified efficiency (pin-efficiency), have no more than a fixed number of outputs not at a specified quiescent level (density,) etc. In many cases, satisfaction of those constraints is inherent in the code's design. As an example, each code word of Knuth's binary balanced code contains the same number of ones and zeros, thus no matter what code word is transmitted, the average DC level of the resulting bit stream (that is, its disparity) will remain constant from code word to code word.

Conversely, codes such as the well-known 8b10b code used in Gigabit Ethernet signaling do not have constant disparity across all code words. Instead, the available code words are grouped into three categories; those having zero disparity, those having positive disparity, and those having negative disparity. Individual code words in the latter two groups are paired, such that any one data value is represented either by a single code word of zero disparity, or by either of a pair of code words, one having positive disparity and one having negative disparity. The transmitter maintains a record of the running disparity (e.g. the long term disparity of its output,) and whenever a data value represented by paired code words is to be sent, the code word in the pair that drives the running disparity closer to zero is used. Thus, the particular mapping of some data values to code words in such a paired disparity code is dependent on an external value, in this case the running disparity of the transmitted data stream.

A higher-level communications protocol may be introduced as a means of satisfying design criteria. As an example, one embodiment reserves one or more particular code words for protocol use, rather than directly representing a data value. The protocol responds to excessive running disparity by introducing a protocol sequence representing a disparity correction into the transmitted output stream. This protocol sequence may be a reserved code word of the appropriate disparity which the receiver will interpret as a null value; a reserved code word representing a "protocol escape" followed by a corrective value, both of which will be interpreted by the receiver as a null value; or other sequence coordinated between the transmitter and receiver. In some embodiments, there are insufficient code words available to represent all possible data values and allow one or more reserved values for protocol use. In such embodiments, a protocol sequence is used to signal transmission of the data value or values not directly mapping to unique data values, either with or without additional protocol action such as disparity correction.

Other transmission characteristics such as SSO may be compensated by protocol operation. One embodiment corrects for excessive SSO by issuing a protocol message causing the transmitter and receiver to synchronously change the mapping used for encoded transmissions. Thus, as an example, transmission of a code word having too many simultaneously switched output values is avoided by replacing it with a mapping having fewer simultaneously switched output values and a notification to the receiver of the amended mapping. The notification may be performed at the same time as or sequentially preceding transmission of code words using the amended mapping.

Correction or normalization of adiabatic performance may also be performed using these methods. At least one embodiment maintains a running measure of adiabatic performance (as one example, the mid-rail voltage available to the output drivers from the charge transfers of previous output cycles) which is used as the external value controlling encoder action, examples including selection among paired code word values to drive the measured value in the desired direction, and introduction of protocol sequences to provide the desired correction or compensation. Unlike disparity, which is an inherent characteristic of a code word itself, the adiabatic performance is also dependent on the difference between the previous code word and the code word to be transmitted, which determines the quantity and direction of charge transfer between output line capacitance and the mid-rail supply. One familiar with the art can easily adapt known adaptive methods based on this knowledge.

Once instantiated, the higher-level communications protocol may provide additional capabilities, such as transport for a secondary communications channel between transmitter and receiver, and initialization of receiver state to a known value, including initialization of data scramblers, line equalization, clean startup and shutdown of the communications channel, etc.

Adiabatic Code Analysis

In accordance with at least one embodiment, an adiabatic code may be described as "AC coupling compatible," i.e. its information content is encoded in the high frequency components of the serial sequence of code words transmitted sequentially over time, with the DC component (i.e. the quiescent signal level) suppressed or ignored. Thus, the encoding process may be interpreted as a high-pass or differentiating filter action, with first-order, second-order, and higher-order filtering operations possible.

First-Order Adiabatic Code

Figure 4:
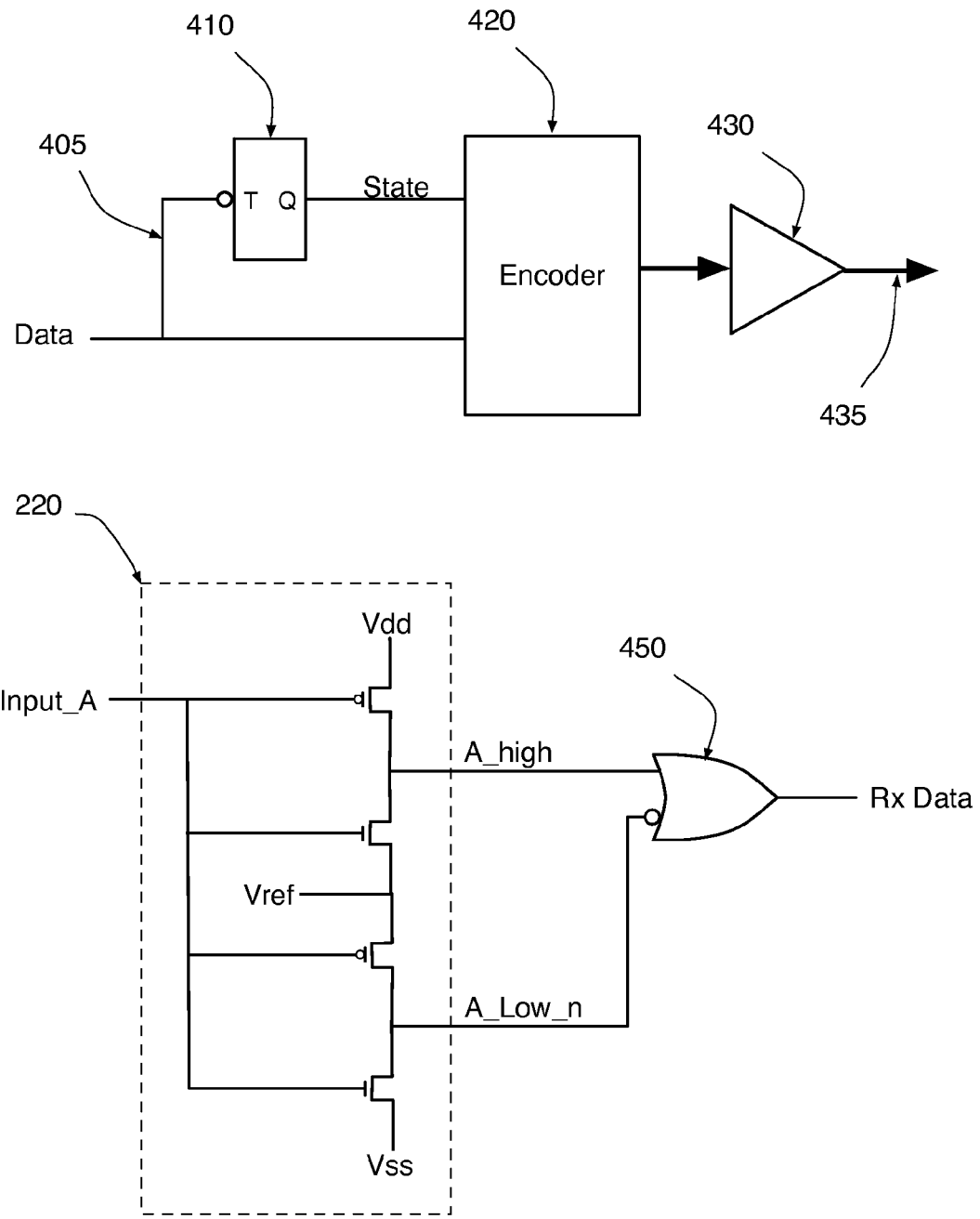
FIG. 4 is a block diagram of a first-order adiabatic encoder and decoder in accordance with at least one embodiment of the invention.

As one example of a simple first-order encoder, each 0 data bit may be represented by the "0" symbol value, and each 1 data bit by either the "+" or "−" symbol value, used alternately for each uninterrupted sequence of 1 bits. FIG. 4 shows a schematic diagram of this encoder. One bit of state 410 is maintained at the transmitter to remember which symbol value should represent a data 1. The state value is toggled whenever an input data value of 0 is followed by a value of 1, or alternatively whenever an input data value of 1 is followed by a value of 0. No initialization of the state value is required, and no state variable is required at the receiver.

FIG. 4 shows the example of State being toggled on each 1 to 0 transition of Data 405, with Encoder 420 selecting between a "0" symbol value for each Data 0, or a "+" or "−" symbol value as selected by State for each Data 1. The symbol values represent signal levels produced by output driver 430 as transmission outputs 435.

This first-order adiabatic code is used for the example of FIG. 3, with 320 illustrating the encoded data bit sequence [1, 0, 1, 0, 1, 1, 0, 0, 1, 0, 1, 1 0, 0, 0], and 330, 340, and 350 showing the associated currents of Vdd, Vss, and the mid-level voltage.

The receiver may detect absolute values of input signals, a comparison of the current input signal to one or more stored representation of a previous input signal, or a comparison of an input signal to one or more reference derived from the time averaging of past input signals. FIG. 4 also provides an example of a receiver 220 detecting an input signal using reference voltage Vref. Decoding is straightforward, with an input representing a "0" symbol value identifying a data 0, and any other input value representing a data 1. In the example of FIG. 4, a single OR gate 450 suffices to perform this decoding, with output Rx Data being true if either Input_A is a +1 (identified by A_high being high,) or if Input_A is a −1 (identified by A_low_n being low.)

It is noted that the described code shares some similarities with the known MLT-3 code specified as part of the 100Base-TX physical medium layer for Ethernet. Given the input data bit sequence a0, a1, a2, a3 . . . if one performs a pre-coding to obtain (a0 XOR a1), (a1 XOR a2), (a2 XOR a3), . . . and then MLT-3 encodes those values, the present code results are obtained. However, various embodiments described herein may require less state to be maintained within the transmitter than MLT-3, and embodiments of its encoder and decoder are less complex.

Instantaneous SSO for any wire using this code is a maximum of 0.5, representing a transition between a + or − symbol and an 0 symbol in either direction, which is ½ the SSO of a comparable binary CMOS output wire. Statistically, a normal distribution of input data values encoded with this code should produce relatively well-balanced output transitions across a number of output wires with low aggregate SSO. However, pathological patterns do exist; if the internal states of multiple wire drivers become synchronized, a data transition from "all 0's" to "all 1's" input data may result in some or all output lines transitioning simultaneously in the same direction, maximizing SSO across k wires to a peak of k*½. Introduction of a higher-layer transport protocol on the communications link may ameliorate this issue and/or limit run lengths of unchanging output values, at the cost of higher complexity and reduced throughput, by allowing introduction of "pattern breaking" values into the data stream either directly or as part of an escape sequence, using one or more particular values reserved for such protocol use.

Transition Codes as Examples of Adiabatic Codes

Transition encodings, i.e. encoding changes in the input data bit rather than the absolute value of the data bit, also represent examples of adiabatic encoding. Transition encodings have the further advantage of minimizing all output transitions, further reducing output drive current utilization. However, as the input data stream may include arbitrary strings of repeated values (thus, no transitions,) the resulting encoded data stream may also have significant run lengths of the same value unless other run-length limiting measures are introduced to optimize their adiabatic factor.

In accordance with at least one embodiment, a three output transition code variation of the known TL3 encoding has been developed having enhanced adiabatic behavior, herein called TLA3 code. TLA3 can encode seven code words into three output wires, achieving 2.8b3w efficiency (as eight code words are required to communicate three independent bits.) SSO is 0.33 of an unmodified binary CMOS interface of the same width, and its adiabatic performance is deterministic (i.e. absolutely rather than statistically bounded.)

In accordance with at least one embodiment, a four output transition code variation of the known TL4 encoding has also been developed having enhanced adiabatic behavior, herein called TLA4 code. TLA4 can encode fifteen code words into four output wires, achieving 3.9b4w efficiency (as sixteen code words are required to communicate four independent bits.) SSO is 0.375 of an unmodified binary CMOS interface of the same width, and it presents deterministic adiabatic performance.

The encoders for TLA3 and TLA4 are very similar to TL3 and TL4 encoders. Each requires two bitwise operations called a one-flip and a two-flip, the behaviors of which are controlled by an internal variable herein called DISPARITY_POS. If the ternary output levels are labeled as 0, 1 & 2 (with 1 being the mid-level value) the transition rules between output levels for the operations are given in Table 2 and Table 3.

TABLE 2 one-flip state transitions

| DISPARITY_POS | Previous state | New state |
|---|---|---|
| 0 | 0 | 1 |
| 0 | 1 | 0 |
| 0 | 2 | 1 |
| 1 | 0 | 1 |
| 1 | 1 | 2 |
| 1 | 2 | 1 |

TABLE 3 two-flip state transitions

| DISPARITY_POS | Previous state | New state |
|---|---|---|
| 0 | 0 | 1 |
| 0 | 1 | 0 |
| 0 | 2 | 0 |
| 1 | 0 | 2 |
| 1 | 1 | 2 |
| 1 | 2 | 1 |

The encoding rules to encode code words 0-6 using TLA3 are:

For code word=0=>no change
For code word=1=>apply two-flip to bit 0
For code word=2=>apply two-flip to bit 1
For code word=3=>apply two-flip to bit 2
For code word=4=>apply one-flip to bits 0 & 1
For code word=5=>apply one-flip to bits 0 & 2
For code word=6=>apply one-flip to bits 1 & 2

The encoding rules to encode code words 0-15 using TLA4 are:

For code word=0=>no change
For code word=1=>apply two-flip to bit 0
For code word=2=>apply two-flip to bit 1
For code word=3=>apply two-flip to bit 2
For code word=4=>apply two-flip to bit 3
For code word=5=>apply one-flip to bits 0, 1 & 2
For code word=6=>apply one-flip to bits 0, 1 & 3
For code word=7=>apply one-flip to bits 0, 2 & 3
For code word=8=>apply one-flip to bits 1, 2 & 3
For code word=9=>apply one-flip to bit 0 and two-flip to bit 1
For code word=10=>apply one-flip to bit 0 and two-flip to bit 2
For code word=11=>apply one-flip to bit 0 and two-flip to bit 3
For code word=12=>apply one-flip to bit 1 and two-flip to bit 2
For code word=13=>apply one-flip to bit 1 and two-flip to bit 3
For code word=14=>apply one-flip to bit 2 and two-flip to bit 3

As examples, a four bit binary counter for TLA3 or a five bit counter for TLA5, herein referred to as DISPARITY_COUNT, may be introduced into both the transition code encoder and decoder, to track the running sum of the transitions and correct any adiabatic disparity. Each positive transition toward the mid-level (e.g. 0→1, with the output level naming above) increments the counter, while negative transitions toward the mid-level (e.g. 2→1) decrement the counter; transitions away from the mid-level (e.g. 1→2 or 1→0) do not change the counter value. The most significant bit of the DISPARITY_COUNT (i.e. the inverse of its most significant bit, if the counter value is interpreted as a 2's compliment value) provides the value of DISPARITY_POS for use in the operations of Table 2 and Table 3, with the result that a nominal positive running disparity is in general driven lower, and a nominal negative running disparity is in general driven higher by the resulting code words.

The goal of the one-flip state transition is to prevent the adiabatic balance from getting more than one more transition worse. It does this by making the transitions away from a previous state=1 always go in the direction that will make the following transition restore the adiabatic balance. The transitions away from a previous state of 0 or 2 always transition to 1. If the DISPARITY_POS value=1, the input code always selects a one-flip value on the wire in question, and we assume a starting point of 0, the value on that wire will cycle between 0, 1, 2, 1, 2, 1 until the adiabatic balance is restored and DISPARITY_POS value becomes 0. In this example the DISPARITY_COUNT value (2's complement) would be 1, 2, 1, 1, 0, 0, 31.

The goal of the two-flip state transition is to rapidly restore the adiabatic balance. It does this by getting the value directly to the most extreme value in the direction that will make the following transition restore the adiabatic balance. If the DISPARITY_POS value=1, the input code always selects a two-flip value on the wire in question, and we assume a starting point of 0, the value on that wire will cycle between 0, 2, 1, 2, 1, 2, 1 until the adiabatic balance is restored and DISPARITY_POS value becomes 0. In this example the DISPARITY_COUNT value (2's complement) would be 2, 2, 1, 1, 0, 0, 31.

The use of the two-flip value is optional. The circuit has more peak-SSO, but restores the adiabatic balance more quickly. If the regulator circuit has a stronger capability to hold the value near the mid-point, a simpler circuit with only one-flip circuits may be employed.

Figure 5:
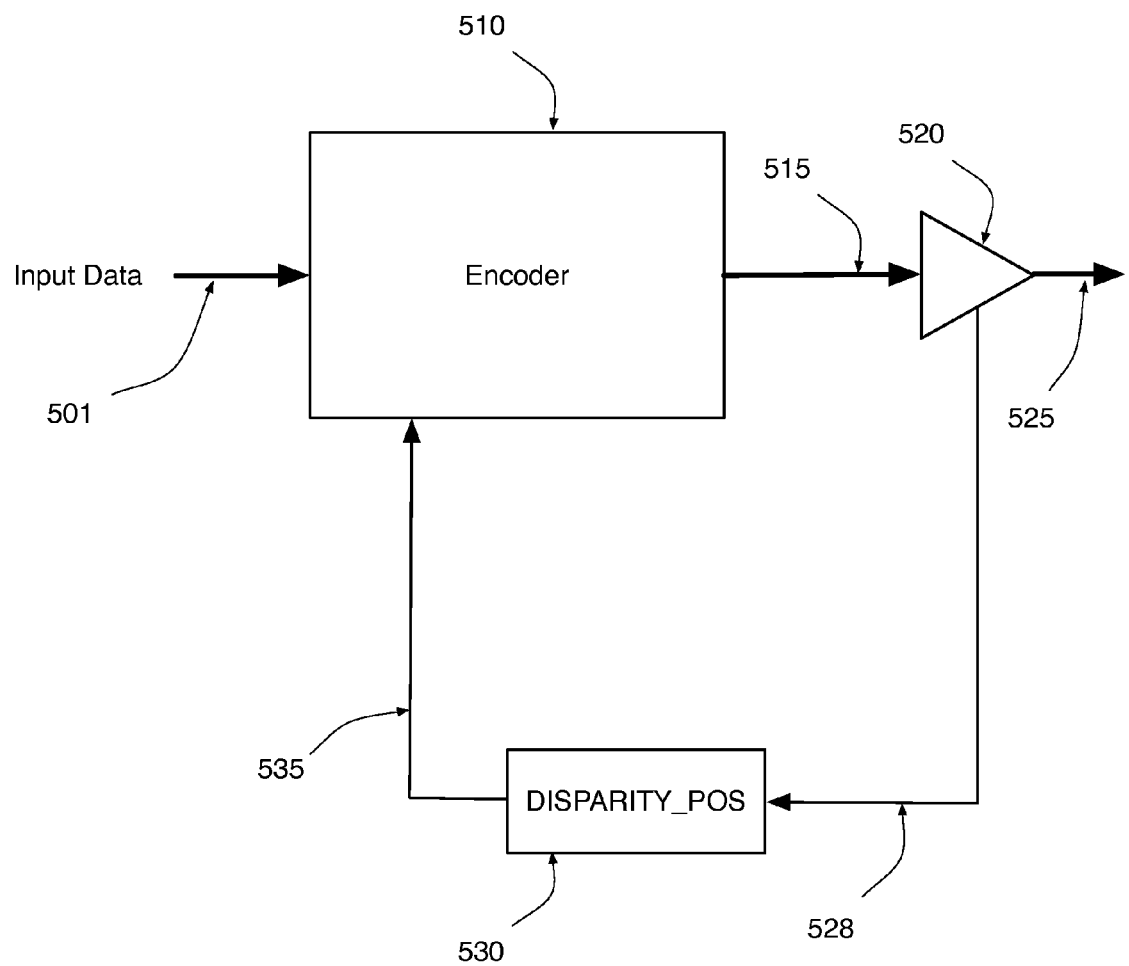
FIG. 5 is a block diagram of a transition encoder with enhanced adiabatic behavior in accordance with at least one embodiment of the invention.

FIG. 5 is a block diagram of an encoder in accordance with at least one embodiment. Input Data 501 is presented to Encoder 510 along with DISPARITY_POS 530 information 535. The described encoding manipulations are performed to produce code word 515 which output driver 520 uses to produce transmission outputs 525. Transmitted adiabatic disparity information 528 then updates counter DISPARITY_POS for subsequent use.

Alternate Embodiment of an Adiabatic Code

An alternative embodiment of an adiabatic encoder utilizes two bits of history:

PrevMax, which records which maximum output extent was last sent, where 0 represents a −1 output, and 1 represents a +1 output, and LastWasMid, which records whether the last output was a mid-level value, with 0 indicating no, and 1 indicating yes.

and encodes one bit of binary input value to a ternary output value based on those two history states using the truth table of Table 4.

TABLE 4

| Input value | PrevMax = 0 LastWasMid = 0 | PrevMax = 0 LastWasMid = 1 | PrevMax = 1 LastWasMid = 0 | PrevMax = 1 LastWasMid = 1 |
|---|---|---|---|---|
| 0 | −1 | 0 | 0 | −1 |
| 1 | 0 | +1 | +1 | 0 |

An example of this code is:
Input: 0, 0, 0, 0, 0, 1, 1, 1, 0, 1, 0, 0, 0, 1
Output: X, X, −1, −1, −1, 0, 1, 1, 0, 0, −1, −1, −1, 0

The history maintained in this encoder is self-initialized once a +1 or −1 value is sent. Alternatively, it may be initialized using an external reset operation or protocol sequence as part of link startup or chip power-up.

Figure 6:
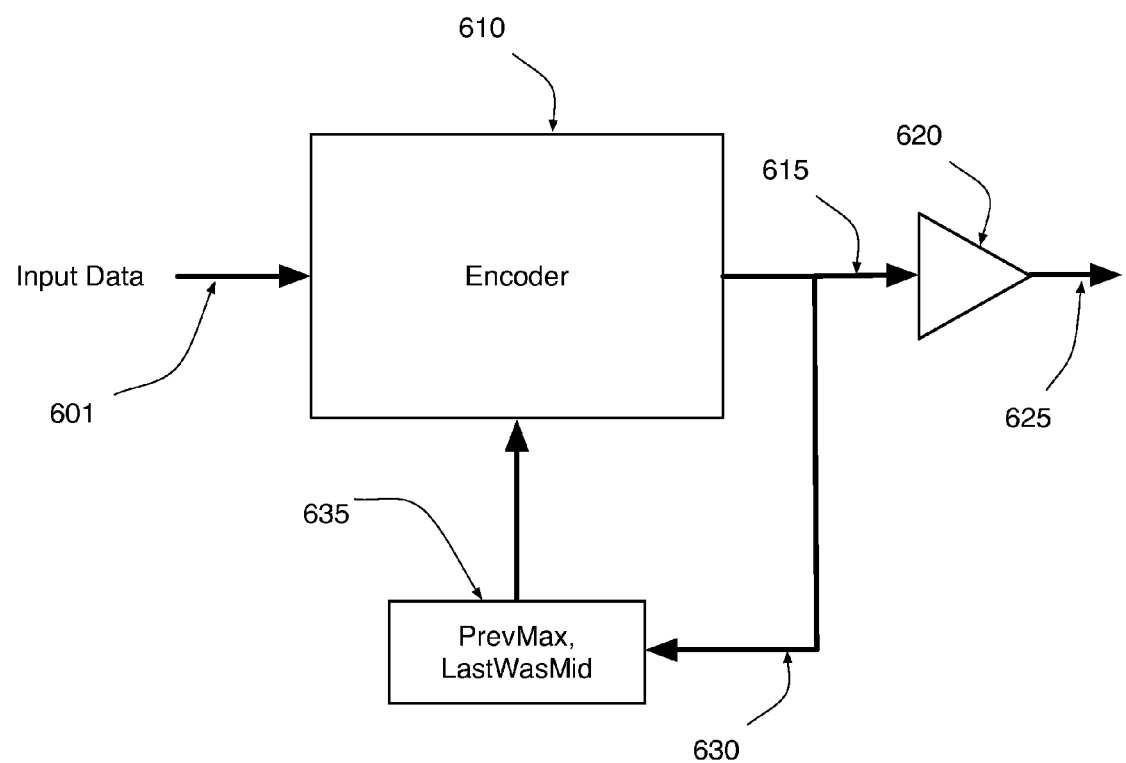
FIG. 6 is a block diagram of a second-order adiabatic encoder in accordance with at least one embodiment of the invention.

FIG. 6 is a block diagram of an encoder in accordance with at least one embodiment. Input Data 601 and the state variables PrevMax and LastWasMid 635 are inputs to Encoder 610. The output symbol value 615 determined using the state table is provided to output driver 620 to produce transmission output 625, and is also used to update 630 the state variables.

Adiabatic Modification of Permutation Codes

Permutation codes are a known variety of vector signaling codes in which each code word is a permutation of a given base vector. As one example, the 4 wire ternary permutation code derived from the base vector [+1 0 0 −1] consists of 12 possible code words, sufficient to directly encode 3 binary bits, with a theoretical maximum capacity of 3.58 bits on four wires.

In one embodiment, the possible adiabatic transitions between consecutive code words of this +00− code split the 12 code words in the code space into three non-overlapping sets of four code words, where transitions within each set may be performed with balanced adiabatic effect. Within each of these sets, four of the intra-set transitions save power consumption through balanced transitions to the middle level. The remaining two transitions do not have transitions to the middle-level and as such neither disturb the middle level nor save power. This allows a simple open-loop encoder to work within one of those groups of four code words to encode two bits on four wires.

A further embodiment incorporates a more complex closed-loop encoder which may allow the state to get away from ideal adiabatic balance and then be returned to balance by, as examples, selection between paired code words or insertion of protocol sequences providing adiabatic balance correction, as previously described. This form of running adiabatic correction allows eight code words to be used to encode three bits on four wires, at the cost of maintaining one bit of history within both the encoder and decoder and, optionally, remembering the wire state for the previous transmission interval to facilitate encoding and/or decoding of the present transmission interval. In this embodiment every code word of the {+,0,0,−} permutation code is first encoded as a permutation of the base vector +,0,0,− and that encoded result is then modified to produce wire values so as to produce fewer overall transitions. From each code word, the following table shows the transitions:

TABLE 5

| Destination Code Words | Adiabatic Half-Swing Power Savings | Balance Contribution |
|---|---|---|
| {+, 0, 0, −}, {−, 0, 0, +} | 0 | 0 |
| {0, +, −, 0}, {0, −, +, 0} | 2 | 0 |
| {+, −, 0, 0}, {−, +, 0, 0}, {+, 0, −, 0}, {−, 0, +, 0} | 1 | +1 |
| {0, 0, +, −}, {0, 0, −, +}, {0, +, 0, −}, {0, −, 0, +} | 1 | −1 |

With this code, the encoder and decoder need to maintain a single bit of history. The history bit is either 1 or 0. A 1 means that the last non-zero balance contribution code word that was sent was positive. A 0 means that the last non-zero balance contribution code word that was sent was negative.

When the history value is 1, the eight code words with either a 0 or a −1 balance contribution are employed. When the history value is negative, the eight code words with either a 0 or a +1 balance contribution are employed. This code has excellent error propagation properties because whenever a code is sent that has a non-zero balance contribution the value of the previous history bit is revealed.

Figure 8:
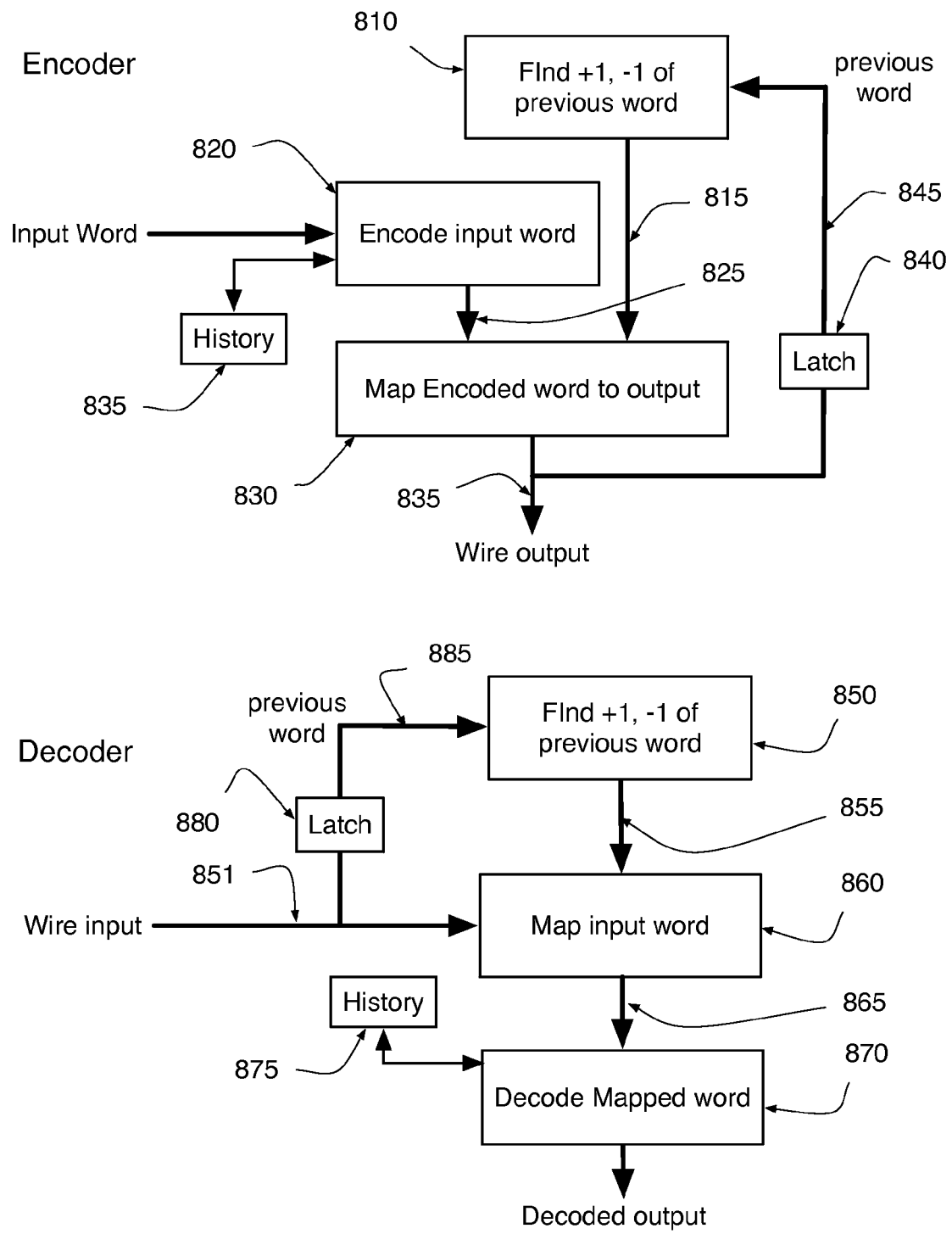
FIG. 8 is a flow chart for an encoder and decoder of an adiabatically modified permutation code, in accordance with at least one embodiment of the invention.

The encoder and decoder for this code are only slightly more complex than with a regular permutation code because all of the code words can be mapped back to the same starting point. In a four wire ternary permutation code, that starting point is +1,0,0,−1. As shown in the flow chart of FIG. 8:

To Encode:

Step 1—Determine where the +1 and −1 were on the previous wire output as 810. For a four-wire ternary +1,0,0,−1 permutation code this determination results in four bits of information 815, namely the positions of the +1 and the −1. The positions of the two zeros are fully determined by the positions of the +1 and −1. Some embodiments may retain the previous wire output 845 to facilitate this determination using a latch 840.

Step 2—Encode 820 the new input word independent of the previous word using the previously recorded history value 835. Update the history value 835.

Step 3—Map 830 the output of the encoder 825 to the wire output 835 as per the bits 815 identified in Step 1.

To Decode:

Step 1—Determine where the +1 and −1 were on the previous wire input as 850. For a four-wire ternary +1,0,0,−1 permutation code this determination results in four bits of information 885, namely the positions of the +1 and the −1. The positions of the two zeros are fully determined by the positions of the +1 and −1. Some embodiments may retain the previous wire input 885 to facilitate this determination using a latch 880.

Step 2—Map 860 the current wire input 851 to mapped input 865 as per the bits 885 identified in Step 1

Step 3—Decode 870 the mapped input 865 to obtain the decoded output using the previously recorded history value 875. Update the history value 875.

An alternate embodiment of the system organizes the encoder so that the encoded values of the codes that have zero balance contributions have constant values across all history values. With this embodiment, the receiver does not have to retain a history value of the balance contribution because said receiver can unambiguously decode all inputs independent of the history value.

Although said code is robust to errors, other complex codes are not. With some more elaborate codes, the history value will be IIR-like and would have bad error propagation. Reserving one code as a "base" code permits the history value to statistically recover from errors at the cost of reducing the maximum encoding capacity slightly.

Variable Throughput Adiabatic Encoder

As another example, one 8b8w balanced ternary permutation code consists of all permutations of the base vector [+1 +1 0 0 0 0 −1 −1]. With 420 distinct permutations, it is straightforward to encode eight bits of information on eight wires using this code, with a theoretical maximum of 8.71 bits encoding capacity. Of those 420 possible code words, a total of 94 transitions from a given code word to a new code word may occur with ideal adiabatic behavior, sufficient to encode 6.55 binary bits. Thus, with no additional state being introduced into the encoder and disregarding encoder complexity, constraining the 8b8w code to only code word transitions offering optimum adiabatic behavior costs 2.16 bits of encoded capacity. Introducing higher-level protocol behavior to maintain adiabatic operation, such as the adiabatic tracking and paired code word selection techniques previously described, may allow encoding of additional data with acceptable adiabatic performance, albeit with progressively greater amounts of complexity.

Figure 7:
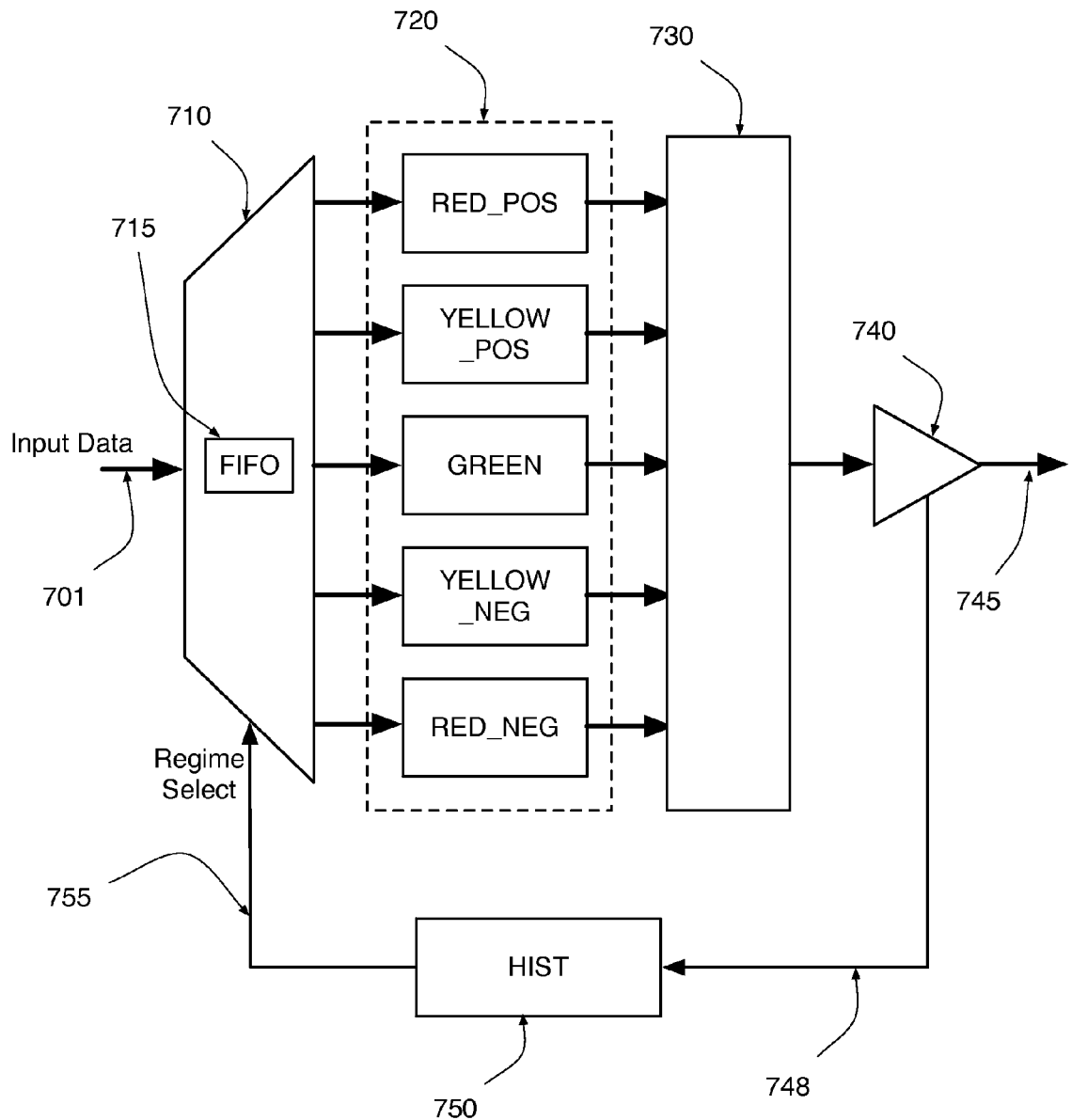
FIG. 7 is a block diagram of a variable throughput adiabatic encoder in accordance with at least one embodiment of the invention.

One embodiment illustrated by the block diagram of FIG. 7 maintains additional internal history in the encoder and decoder, used as state variable to select among different coding strategies. As previously described, the set of code words in the code space are grouped into three non-overlapping sets of code words, where transitions within each set may be performed with optimum adiabatic effect. From any previous code word in a given set, a transition to one other set of code words will produce one or two bits of positive adiabatic offset, and a transition into the other set produces one or two bits of negative adiabatic offset.

As an example, consider a state value HIST 750 that may take on a number of values representing the current adiabatic state, those values divided into ranges representing particular modes of operation or decision regimes. For purposes of description and without limitation, assume HIST may take on values ranging from +10 to −10, and that those values are divided into five ranges representing different operational modes, named and classified as shown in Table 5 and illustrated as 720 of FIG. 7.

TABLE 5

| Regime | Value range |
|---|---|
| RED_POS | HIST > 9 |
| YELOW_POS | 9 ≥ HIST > 4 |
| GREEN | 4 ≥ HIST > −4 |
| YELLOW_NEG | −4 ≥ HIST > −10 |
| RED_NEG | −10 ≥ HIST |

The goal of the GREEN decision regime mode is to obtain maximum throughput, with no regard as to adiabatic behavior.

The goal of the YELLOW_POS regime is to obtain good throughput, with a statistical bias towards adiabatic balance.

The goal of the RED_POS regime is to push the balance back into YELLOW_POS while still maintaining some throughput.

Similarly, the goal of YELLOW_NEG is to obtain good throughput with a statistical bias towards adiabatic balance.

The goal of the RED_NEG regime is to push the balance back into YELLOW_NEG while still maintaining some throughput.

A further goal of the encoding in all modes or regimes is to maintain tolerance to line errors, by carefully insuring that the code will allow HIST to eventually converge to the correct value at both transmitter and receiver after errors have occurred.

The encoder selects 710 one of the decision regimes 720 based on the value 755 of HIST 750. In a manner similar to that of a well-know Huffman encoder, a variable number of input bits 701 are mapped 730 into a code word, depending on the particular decision regime selected based on HIST, and the value of the input bits. One embodiment incorporates FIFO 715 as a buffer at the transmitter and a similar buffer at the receiver data output, to isolate external systems from the effects of this variable transmission rate. The symbols of the selected code word represent signal levels produced by output driver 740 as transmission outputs 745. Deviations of the adiabatic state (as one example, representing sourced and sunk current on the mid-level voltage from each transmitted code word) control 748 increment and decrement of the HIST variable 750, and thus informs the selection of the operating regime 755 for subsequent operations. A further embodiment incorporates a rate-matching FIFO to receive input data and provide output data, optionally also providing back-pressure to the data source depending on the throughput achieved.

An example mapping for the YELLOW_POS regime is shown in Table 6, where A-Pos represents code words having positive adiabatic effect, A-Bal represents code words having neutral adiabatic effect, and A-Neg represents code words having negative adiabatic effect.

TABLE 6

| Input bits | Code word |
|---|---|
| 00000 | A-Pos cw0 |
| 00001 | A-Pos cw1 |
| 00010 | A-Pos cw2 |
| 00011 | A-Pos cw3 |
| 0010 | A-Bal cw0 |
| 0011 | A-Bal cw1 |
| 0100 | A-Bal cw2 |
| 0101 | A-Bal cw3 |
| 0110 | A-Bal cw4 |
| 0111 | A-Bal cw5 |
| 100 | A-Neg cw0 |
| 101 | A-Neg cw1 |
| 110 | A-Neg cw2 |
| 111 | A-Neg cw3 |

Thus, if input bits are accepted in a left-to-right order for encoding, it is observed that a minimum of three bits is guaranteed to be encoded regardless of input value, that four bits are encoded for inputs beginning with the bits '01', and five bits are encoded for inputs beginning with '000'. The mapping in this regime uses four code words having positive adiabatic effect, six code words having balanced adiabatic effect, and four code words having negative adiabatic effect. However, the differing number of data bits encoded by the code words having positive and negative adiabatic effects results in a statistical bias towards negative adiabatic effect within this YELLOW_POS regime, as it is more likely that a three bit sequence mapping to an A-Neg code word will appear in the input data stream than a five bit sequence mapping to an A-Pos code word.

An example mapping for the RED_POS regime is shown in Table 7.

TABLE 7

| Input bits | Code word |
|---|---|
| 000 | A-Bal cw0 |
| 001 | A-Bal cw 1 |
| 0100 | A-Bal cw 2 |
| 0101 | A-Bal cw 3 |
| 0110 | A-Bal cw4 |
| 0111 | A-Bal cw5 |
| 100 | A-Neg cw0 |
| 101 | A-Neg cw1 |
| 110 | A-Neg cw2 |
| 111 | A-Neg cw3 |

Thus, if input bits are accepted in a left-to-right order for encoding, it is observed that a minimum of three bits is guaranteed to be encoded regardless of input value, and that four bits are encoded for inputs beginning with the bits '01'. The mapping in this regime uses six code words having balanced adiabatic effect, and four code words having negative adiabatic effect. Thus, operation in this regime will either maintain the current adiabatic state (based on issuance of an adiabatically balanced output value) or will drive the state negative (based on issuance of an adiabatically negative output value.)

Given these teachings, one familiar with the art may continue the example to obtain codes providing adiabatic effect with as much as 7.55 bits of theoretical encoding capability and good error recovery. The number of regimes, the range of throughput provided within each regime, and the aggressiveness of each regime in maintaining adiabatic balance may be chosen to optimize behavior for the intended environment, while remaining within the teachings of the described embodiments.

Protocol Escape and Corrective Sequence

As previously mentioned, a variable rate system can be constructed by the use of a protocol escape followed by a corrective sequence. For example, in a 4 ternary value balanced permutation code, the value {2,1,1,0} could be reserved as a protocol escape. When this value is sent, the receiver knows to receive it and all values succeeding it as null until it sees another {2,1,1,0} value to terminate the escape. If the DISPARITY_POS was negative, the transmitter could cycle between {2,1,1,0} and {2,1,0,1} until DISPARITY_POS became positive. Similarly, if the DISPARITY_POS was positive, the transmitter could cycle between {2,1,1,0} and {1,2,1,0) until DISPARITY_POS became negative. One familiar with the art may easily extend this concept to provide correction of other transmission effects, or to combine such correction with communication of data values as part of the protocol sequence.

Further Extensions

Given these examples, one of skill in the art can easily extend the described results to obtain different balances of energy utilization, pin efficiency, and system complexity. Wider interfaces comprised of multiple instances of a given code may be combined such that a single mapping operation may encompass multiple code words of the multiple instances to more easily utilize the "fractional" bit encoding capacities of each instance. As one example, four instances of the TLA3 three wire code each capable of describing only seven distinct states may be combined to provide an aggregate interface encompassing 7*7*7*7 or 2401 states, sufficient to encode 11 binary bits on twelve wires with additional states available for protocol or other use.

Without limitation, the described encoding and decoding may be combined with known data scrambling, encryption, and buffering elements. As an example, the described variable throughput encoding may synergistically be combined with data scrambling to reduce the impact that particular data patterns may otherwise have on communications throughput, as will be understood by one familiar with the art.

The examples presented herein illustrate the use of vector signaling codes for point-to-point chip-to-chip interconnection. However, this should not been seen in any way as limiting the scope of the described invention. The methods disclosed in this application are equally applicable to other interconnection topologies and other communication media including optical, capacitive, inductive, and wireless communications, which may rely on any of the characteristics of the described invention, including but not limited to disparity, adiabatic effect, and transition behavior. Thus, descriptive terms such as "voltage" or "signal level" should be considered to include equivalents in other measurement systems, such as "optical intensity", "RF modulation", etc. As used herein, the term "physical signal" includes any suitable behavior and/or attribute of a physical phenomenon capable of conveying information. Physical signals may be tangible and non-transitory.

We claim:

1. A system for interconnection of two or more integrated circuit devices using a vector signaling code to communicate binary data, the system comprising:
    a collection of interconnection wires connecting the two or more integrated circuit devices, the wires representing an essentially capacitive load;
    a transmission interface to the collection of interconnection wires in at least one of the integrated circuit devices;
    an encoder configured to receive the binary data and to responsively generate a vector signaling code word of three or more levels in the transmission interface;
    a transmit driver configured to communicate the vector signaling code word from the transmission interface as three or more signal levels, the three or more signal levels comprising '+', '0', and '−' levels on the interconnection wires, the transmit driver comprising:
        transistors connected to supply voltages, the transistors configured to source and sink current to and from the essentially capacitive load of a corresponding wire during transitions from '0' to '+' and '0' to '−', respectively; and
        a storage element configured to store charge from the essentially capacitive load of a first wire during a first transition from a '+' to a '0', and in a subsequent transition on a second wire from a '−' to a '0,' the storage element configured to source current to charge the essentially capacitive load of the second wire to a '0'.

2. The system of claim 1, wherein the stored charge is obtained from transitions between extreme signal levels and intermediate signal levels appearing in the same or previous transmission intervals on one or more wires of the collection of interconnection wires.

3. The system of claim 2, wherein the stored charge is controlled by constraints placed on encoding of the binary data to a vector signaling code word.

4. The system of claim 1, wherein the transmission interface maintains a history of internal state.

5. The system of claim 1, wherein the vector signaling code is a permutation code.

6. The system of claim 1, wherein the encoder communicates changes of the binary data, and the transmission interface maintains a history of internal state encompassing at least one previous transmission interval.

7. The system of claim 6, wherein the encoder comprises a variable rate communications channel for the binary data.

8. The system of claim 7, wherein said variable rate encoder operates by the use of a protocol escape value followed by a corrective sequence.

9. A method for communication of binary data using a vector signaling code between a transmitting integrated circuit device and at least one receiving integrated circuit device, the method comprising:
    encoding the binary data as a vector signaling code word comprising symbols having three or more values, the three or more values comprising a high value ('+'), a middle value ('0'), and a low value ('−');
    transmitting the vector signaling code word as signal levels in one transmission interval on a set of wires, wherein a transition from a '−' to a '0' on a second wire uses energy stored within a storage element, the stored energy recovered from an essentially capacitive load associated with a first wire during a transition from a '+' to a '0' in a prior transmission interval.

10. The method of claim 9, wherein the stored energy is controlled by constraints placed on the encoding.

11. The method of claim 10, wherein the constraints limit allowable changes between a previous code word and a present code word.

12. The method of claim 11, wherein the constraints depend on a history of previous signal level transmissions.

13. The method of claim 12, wherein encoding comprises a first conversion of the binary data into a canonical form and a second conversion of the canonical form into the vector signaling code word incorporating the constraints limiting allowable changes between the previous code word and the present code word.

14. The method of claim 12, wherein encoding and transmitting comprise a variable rate communications channel for the binary data.

15. The method of claim 14, where said variable rate communications channel operates by the use of a protocol escape value and corrective sequence.

16. A method comprising:
    receiving a set of signals representing binary input data;
    encoding the set of signals into symbols of a vector signaling code word, wherein each symbol is represented at least as one of a high level ('+'), a medium level ('0'), or a low level ('−');
    transmitting the symbols of the vector signaling code word over a plurality of wires, each of the wires representing an essentially capacitive load;
    sourcing and sinking charge from supply voltages, using transistors, to the essentially capacitive load of a corresponding wire on transitions from '0' to '+' and from '0' to '−', respectively;
    storing charge from the essentially capacitive load of a first wire in a storage element during a first transition from a '+' to a '0'; and,
    in a subsequent transition on a second wire from a '−' to a '0,' sourcing current from the storage element to charge the essentially capacitive load of the second wire to a '0'.

17. The method of claim 16, wherein the storage element is a capacitor.

18. The method of claim 17, wherein the capacitor has a capacitance at least 10× larger than a capacitance of the capacitive load.

19. The method of claim 16, wherein the storage element is selected from the group consisting of an on chip element and an external device.

20. The method of claim 16, wherein symbol transitions on the plurality of wires are controlled by constraints placed on the encoding of the binary input data to symbols of a vector signaling code word.

* * * * *